United States Patent [19]

Maher, Jr. et al.

[11] Patent Number: 5,309,735

[45] Date of Patent: May 10, 1994

[54] FOUR WHEEL AIR CYCLE MACHINE

[75] Inventors: John F. Maher, Jr., Enfield, Conn.; Brent J. Merritt, Westfield, Mass.; Christopher McAuliffe, Windsor; Paul J. Dziorny, Manchester, both of Conn.

[73] Assignee: United Technologies Corporation, Hartford, Conn.

[21] Appl. No.: 96,712

[22] Filed: Jul. 23, 1993

Related U.S. Application Data

[63] Continuation of Ser. No. 757,889, Sep. 11, 1991, abandoned.

[51] Int. Cl.[5] .............................................. F25D 9/00
[52] U.S. Cl. ...................................... 62/402; 417/406; 454/71
[58] Field of Search ............... 417/406, 407, 408, 409, 417/405; 62/401, 402, 86; 454/71, 72, 73, 74, 76

[56] References Cited

U.S. PATENT DOCUMENTS

| | | | |
|---|---|---|---|
| 2,492,672 | 12/1949 | Wood | 230/117 |
| 3,052,106 | 9/1962 | Sampietro et al. | 62/402 |
| 3,080,728 | 3/1963 | Groves et al. | 62/172 |
| 3,289,436 | 12/1966 | Groves et al. | 62/402 |
| 3,428,242 | 2/1969 | Rannenberg | 230/116 |
| 3,523,428 | 8/1970 | Nagyszalanczy | 62/402 |
| 3,877,246 | 4/1975 | Schutze | 62/402 |
| 4,260,339 | 4/1981 | Lofts | 417/406 |
| 4,312,191 | 1/1982 | Biagini | 62/402 |
| 4,482,303 | 11/1984 | Acosta | 417/406 |
| 4,507,939 | 4/1985 | Wieland | 62/402 |
| 4,963,174 | 10/1990 | Payne | 62/87 |
| 5,113,670 | 5/1992 | McAuliffe et al. | 417/407 |

Primary Examiner—Richard A. Bertsch
Assistant Examiner—William Wicker
Attorney, Agent, or Firm—Donald S. Holland

[57] ABSTRACT

An air cycle machine (10) has four wheels mounted on a common shaft (20) for rotation therewith about a longitudinal axis (12), including a second stage turbine rotor (30) mounted to a first end (20a) of the shaft, a fan rotor (40) mounted to a second end (20b) of the shaft, a first stage turbine rotor (50) mounted to a central portion (20c) of the shaft, a compressor rotor (60) mounted to the central portion of the shaft in back to back relation to the first stage turbine rotor, the first and second stage turbine rotors being operative to extract energy from a flow of compressed air for driving the shaft (20), and the fan rotor (40) and the compressor rotor (60), in rotation about the axis, and first and second hydrodynamic gas film foil bearings (70, 80) for supporting the shaft for rotation about the longitudinal axis (12).

8 Claims, 3 Drawing Sheets

FOUR WHEEL AIR CYCLE MACHINE

This application is a continuation of application Ser. No. 07/757,889, filed Sep. 11, 1991, now abandoned.

TECHNICAL FIELD

The present invention relates generally to air conditioning systems of the type utilized on environmental control systems to cool and dehumidify air for supply to an aircraft cabin or the like and, more particularly, to an air cycle machine having four wheels mounted on a common drive shaft.

BACKGROUND ART

Conventional aircraft environmental control systems incorporate an air cycle machine, also referred to as an air cycle cooling machine, for use in cooling and dehumidifying air for supply to the aircraft cabin for occupant comfort. Typically, such air cycle machines are three wheel machines comprised of a compressor, a turbine, and a fan disposed at axially spaced intervals along a common shaft, the turbine driving both the compressor and the fan. The three wheels are supported for rotation about the axis of the shaft on one or more bearing assemblies disposed about the drive shaft, such as a pair of spaced bearing assemblies, one bearing assembly disposed intermediate each pair of adjacent spaced wheels. Although the bearing assemblies may be ball bearings or the like, hydrodynamic film bearings, such as gas film foil bearings, are often utilized on state-of-the-art air cycle machines. For example, three wheel air cycle machines are disclosed in U.S. Pat. Nos. 3,428,242 and 4,507,939; and also in commonly assigned, U.S. Pat. No. 5,113,672.

The three wheel air cycle machine disclosed in commonly assigned U.S. Pat. No. 3,428,242 comprises a fan, a compressor and a cooling turbine mounted to a common shaft driven by the turbine, with the fan being disposed at one end of the shaft and the turbine and compressor being disposed in back to back relationship at the other end of the shaft with the turbine inboard of the compressor. The shaft is rotatively supported on a ball bearing assembly disposed intermediate the fan and the turbine and cooled by turbine outlet air.

In U.S. Pat. No. 4,507,939, a three wheel air cycle machine is disclosed which includes a fan, a compressor and a turbine mounted to a common shaft driven by the turbine with the fan being disposed between the compressor and the turbine which are mounted to the opposite ends of the shaft. Rotational support for the shaft is provided by a pair of gas film bearings, one disposed about the shaft intermediate the fan and the compressor and the other disposed about the shaft intermediate the fan and the turbine. Both gas film bearings are cooled and pressurized with compressed air passed from the inlet to the cooling turbine through the bearing and thence discharged into the fan inlet or outlet ducts.

The three wheel air cycle machine disclosed in commonly assigned U.S. Pat. No. 5,113,672 also incorporates a fan, a compressor and turbine mounted to a common shaft driven by the turbine and supported on a pair of hydrodynamic film foil bearings. In this air cycle machine, the compressor is centrally disposed on the shaft with the fan and the turbine disposed at opposite ends of the shaft thereby providing for axial discharge of the fan exhaust and the turbine exhaust. One of the hydrodynamic film foil bearings supporting the shaft is disposed between the compressor and the turbine and the other between the compressor and the fan. A bearing cooling circuit is provided whereby compressed air from the turbine inlet duct is passed first through one bearing and thence the other bearing, to both cool and pressurize the hydrodynamic film foil bearings, and thereafter discharged into the compressor inlet duct.

On aircraft powered by turbine engines, the air to be conditioned in the air cycle machine is typically compressed air bled from one or more of the compressor stages of the turbine engine. In conventional systems, this bleed air is passed through the air cycle machine compressor wherein it is further compressed, thence passed through a condensing heat exchanger to cool the compressed air sufficiently to condense moisture therefrom thereby dehumidifying the air before expanding the dehumidified compressed air in the turbine of the air cycle machine to both extract energy from the compressed air so as to drive the shaft and also to cool the expanded turbine exhaust air for use as the cooling fluid in the aforementioned condensing heat exchanger before it is supplied to the cabin as conditioned cooling air. The compressed bleed air being supplied to the compressor of the air cycle machine is typically precooled by passing it through a precooling heat exchanger in heat exchange relationship with ambient air drawn through the precooling heat exchanger by the fan of the air cycle machine.

Although conventional three wheel air cycle machines are satisfactory for use in such conventional environmental control systems, such three wheel air cycle machines are not suitable for use in the improved aircraft environmental control system disclosed in commonly assigned U.S. Pat. No. 5,086,622, wherein the expanded and cooled turbine exhaust air which has passed as the cooling fluid in heat exchange relationship with the compressed air passing through the condensing heat exchanger is, after discharge from the cooling fluid path of the condensing heat exchanger, expanded in a second turbine to cool the expanded air to a desired temperature for supply to the cabin as conditioned cooling air and to extract further energy therefrom. To be suitable for use in this improved aircraft air conditioning system, an air cycle machine must have four wheels, i.e. two turbines, a compressor and a fan.

DISCLOSURE OF INVENTION

It is an object of the present invention to provide a compact four wheel air cycle machine.

It is a further object of the present invention to provide a four wheel air cycle machine wherein four wheels are mounted on a common shaft supported for rotation by a single pair of support bearings.

The air cycle machine of the present invention has four wheels mounted on a common shaft means for rotation therewith about a longitudinal axis, including a first wheel mounted to a first end portion of the shaft means, a second wheel mounted to a second end portion of the shaft means, a third wheel mounted to a central portion of the shaft means in spaced relationship from the first wheel and the second wheel, a fourth wheel mounted to the central portion of the shaft means between the second wheel and the third wheel, at least one of the wheels being operative to extract energy from a flow of compressed air for driving the shaft means in rotation about the axis, and first and second bearing means for supporting the shaft means for rotation about the longitudinal axis. The first bearing means may be disposed intermediate the first wheel and the third wheel, and the second bearing means may be disposed intermediate the second wheel and the fourth wheel.

Advantageously, one of the centrally disposed third and fourth wheels is operative to extract energy from the flow of compressed air for driving the shaft means. In a compact embodiment of the air cycle machine of the present invention particularly suited for use in cooling and humidifying air for supply to an aircraft cabin, the centrally disposed third and fourth wheels are mounted on the shaft means in back to back relationship with the fourth wheel comprising a first stage turbine rotor, the third wheel comprising a compressor rotor, the outboard second wheel comprising a fan rotor, and the outboard first wheel comprising a second stage turbine rotor. The shaft means advantageously comprises a first hollow end shaft member having the second stage turbine rotor mounted to its outboard end and the first stage turbine rotor mounted to its inboard end, a second hollow end shaft member having the compressor rotor mounted to its inboard end and the fan rotor mounted to its outboard end, and an annular central stub shaft member disposed intermediate the first and second end shaft members having the first stage turbine rotor mounted to one end thereof and the compressor rotor mounted to the other end thereof, all disposed coaxially about an elongated tie rod extending along the longitudinal axis of rotation and mounted at one end to the second stage turbine rotor and at its other end to the fan rotor thereby linking the shaft members and the rotors together for rotation about the common axis. The first and second bearing means advantageously comprise hydrodynamic film foil bearings which are disposed, respectively, about the first and second end shaft members, and are cooled and pressurized by air bled from the flow of pressurized conditioning air being supplied to the second stage turbine for expansion therein.

The air cycle machine of the present invention also includes a housing surrounding the four wheels and the shaft means and provides appropriate inlet and outlet ducts for ducting air flow to and from the four wheels, as well as providing support for the bearings. Advantageously, the housing comprises three axial sections, a first end section providing the inlet and outlet ducts for the compressor and the fan, as well as supporting the hydrodynamic bearing disposed about the end shaft member extending therebetween, a central section providing the inlet and outlet ducts for the first stage turbine, as well as supporting the hydrodynamic bearing disposed about the end shaft member extending between the first stage turbine and the second stage turbine, and a second end section providing the inlet and outlet ducts for the second stage turbine.

BRIEF DESCRIPTION OF DRAWING

These and other objects, features and advantages of the present invention will become more apparent in light of the detailed description of the embodiments thereof illustrated in the accompanying drawing, wherein.

BEST MODE FOR CARRYING OUT THE INVENTION

Figure 1:
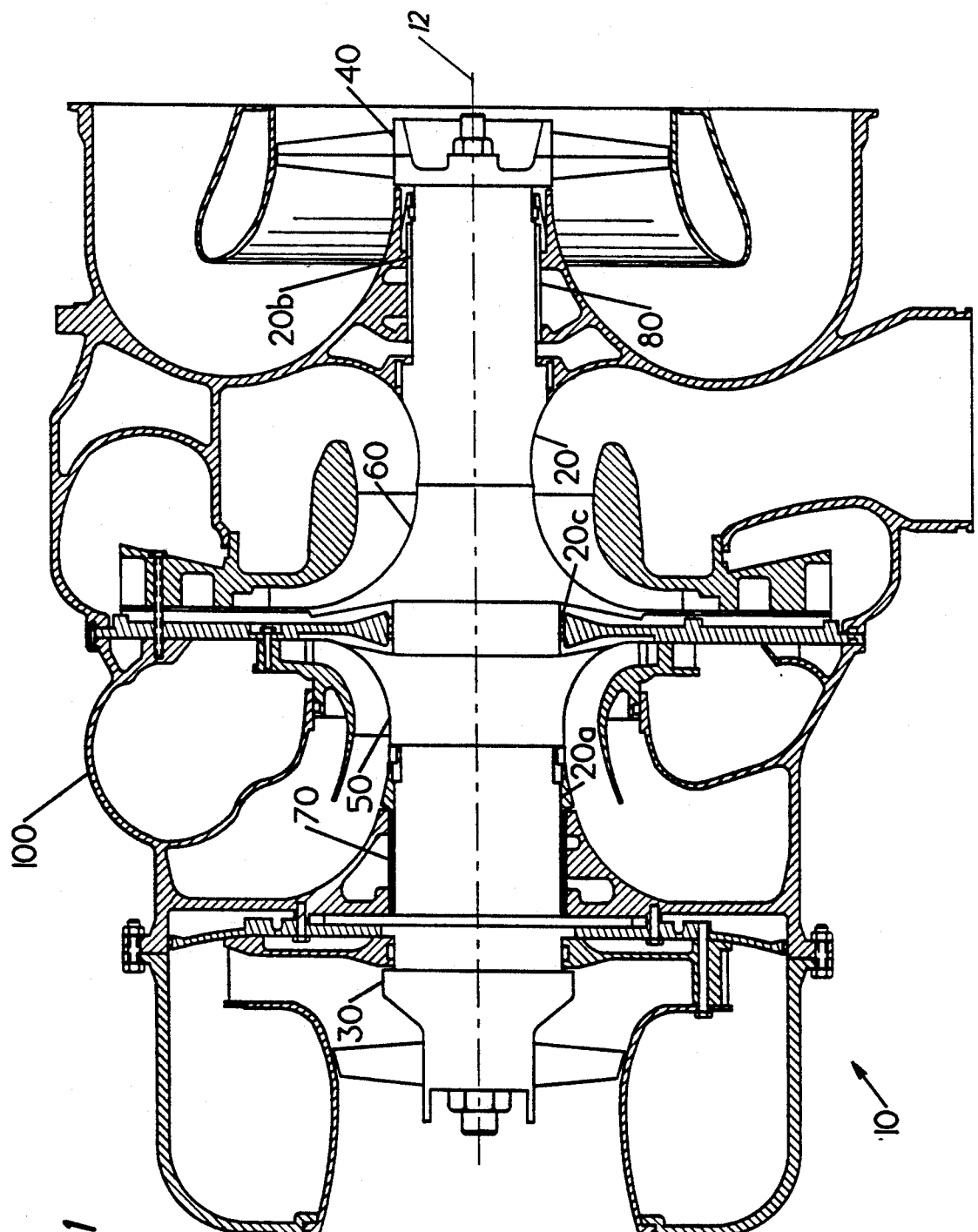
FIG. 1 is a side elevational view, partly in section, of an air cycle machine of the present invention.

Referring now to FIG. 1, there is depicted therein an air cycle machine 10 having four distinct wheels coaxially disposed along a common shaft means 20 for rotation about a common longitudinal axis 12. A first wheel 30 is mounted to a first end portion of the shaft means 20 for rotation therewith, a second wheel 40 is mounted a second end portion of the shaft means 20 for rotation therewith, a third wheel 50 is mounted to a central portion of the shaft means 20 in spaced relationship from the first wheel 30 at one end of the shaft means 20 and the second wheel 40 at the other end of the shaft means 20 for rotation therewith, and a fourth wheel 60 is also mounted to the central portion of the shaft means 20, for rotation therewith, in back-to-back relationship with therewith at a location adjacent the third wheel 50 and between the second wheel 40 and the third wheel 50. The shaft means 20 is supported for rotation about the longitudinal axis 12 on a pair of spaced bearing means 70 and 80 supported in a housing 100 which serves not only to support the bearing means, but also to provide appropriate inlet ducts and outlet ducts for the supply of working fluid to and the discharge of working fluid from each of the four wheels. The first bearing means 70 is disposed about the first end portion 20a of the shaft means 20 intermediate the first wheel 30 mounted to the first end of the shaft means 20 and the third wheel 50 mounted to the central portion 20c of the shaft means 20, and the second bearing means 80 is disposed about the second end portion 20b of the shaft means 20 intermediate the second wheel 40 mounted to the second end of the shaft means 20 and the fourth wheel 60 mounted to the central portion 20c of the shaft means 20. At least one the four distinct wheels mounted to the shaft means 20 for rotation therewith is operative to extract energy from a flow of pressurized gaseous fluid, for example compressed air, for driving the shaft means 20 in rotation about the longitudinal axis 12.

As used herein, the term "back-to-back relationship" refers to the positioning of two rotors or wheels (e.g., 50, 60), that are mounted for rotation on a turbine shaft (e.g., 20), wherein: each rotor has a set of impeller blades on one side and a substantially flat or planar surface on the other side (without any blades); the rotors are supported for rotation by a central disc (e.g., 14) between them, via conventional means (e.g., piloting rims); the two non-bladed surfaces abut the central disc, on opposite sides of the disc; and the two sets of blades extend away from each other, in opposite directions (one to the left and the other to the right, as viewed, for example, in FIG. 1).

Most advantageously, one of the two wheels mounted to the central portion 20c of the shaft means 20, that is either the third wheel 50 or the fourth wheel 60, comprises a compressor rotor operative to compress a flow of gaseous working fluid and the other of the central wheels comprises a turbine rotor operative to expand the gaseous working fluid compressed via the compressor rotor thereby extracting energy therefrom so as to drive the shaft means 20 in rotation about the axis 12 and thereby power the compressor rotor. The two outer wheels, that is the first wheel 30 and the second wheel 40, may each comprise a fan rotor, as in the embodiment depicted in FIG. 1, or one may comprise an additional turbine rotor and the other a fan rotor, as in the embodiment depicted in FIG. 2, or one may comprise an additional turbine rotor and the other an additional compressor rotor, as desired. In fact, the four wheels of the air cycle machine of the present invention may comprise any rotor combination having at least one turbine rotor wherein the turbine rotor, or turbine rotors as the case may be, extracts sufficient energy from the gaseous working fluid expanded therein to drive the shaft means 20, and all fan or compressor rotors mounted thereto, in rotation therewith about the axis 12.

The embodiment of the air cycle machine 10 of the present invention depicted in FIG. 1, wherein the first wheel 30 and the second wheel 40 each comprise a fan rotor, the third wheel 50 comprises a turbine rotor and the fourth wheel 60 comprises a compressor rotor, is particularly suited for use in a conventional aircraft cabin environmental control system, such as the system described in commonly assigned U.S. Pat. No. Re. 32,100, a reissue of U.S. Pat. No. 4,209,993. In the system disclosed therein, two fans are required, one fan to draw a flow of ram cooling air through a primary heat exchanger for precooling compressed bleed air being supplied to the compressor of the air cycle machine and through a secondary heat exchanger for cooling compressed air passing from the compressor to the turbine of the air cycle machine, and the other to recirculate a portion of the cabin air for mixing with the fresh expanded air discharging from the turbine for passage to the cabin as conditioned, i.e. cooled and dehumidified, air.

Heretofore, the air cycle machines customarily utilized in such a conventional aircraft environmental control system have been three wheel machines of the type having a single turbine, a single compressor and a single fan mounted typically to a common shaft driven by the turbine, with the fan rotor thereof being used to draw the ram cooling air through the primary and secondary heat exchangers. Accordingly, it has been necessary to provide a separate, independent auxiliary fan, typically electrically powered, to recirculate the cabin air. However, as the embodiment of the four wheel air cycle machine of the present invention depicted in FIG. 1 includes two fan rotors 30 and 40 commonly mounted to the shaft means 20 driven by the turbine rotor 50, one of the fan rotors may be employed to recirculate the cabin air and the other fan rotor may be utilized to draw the ram cooling air through the primary and secondary heat exchangers, thereby eliminating the need for a separate auxiliary fan. Further, with the two fan rotors 30 and 40 located at the opposite ends of the shaft means 20, the outlets for discharging the air drawn through the fans may be readily disposed to direct the discharge flow axially, which typically simplifies installation and often enhances performance.

Figure 2:
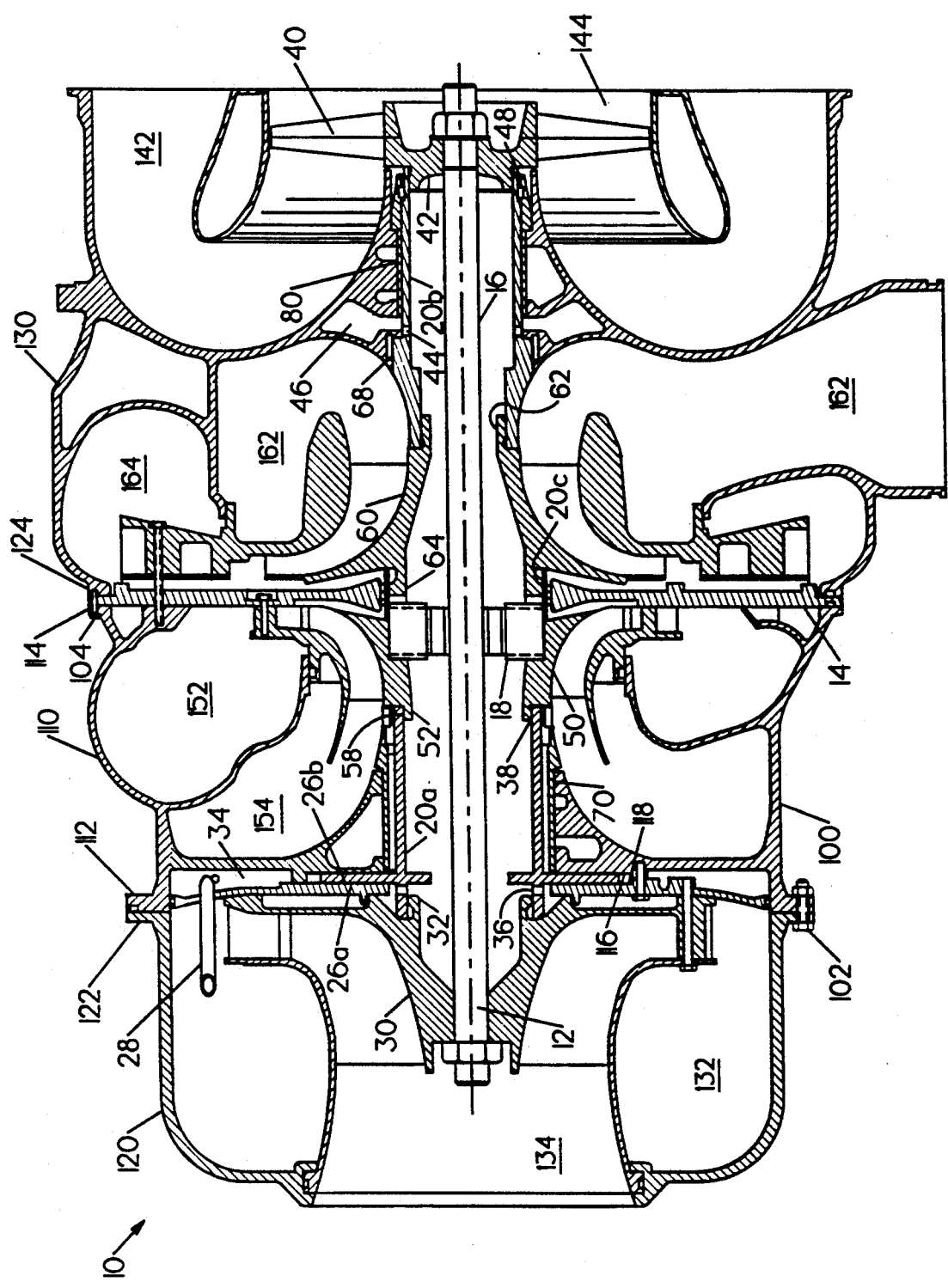
FIG. 2 is a side elevational view, partly in section, of an embodiment of the four wheel air cycle machine of the present invention particularly suited for use in a condensing cycle aircraft cabin air cooling and temperature control system.

Referring now to FIG. 2, the four wheel air cycle machine 10 depicted therein comprises two turbines, a compressor and a fan disposed coaxially along a common shaft means for rotation about a common longitudinal axis 12. The shaft means comprises a first end shaft member 20a, a second end shaft member 20b and a central shaft member 20c disposed coaxially along the longitudinal axis 12. Each of the shaft members 20a, 20b and 20c comprise an annular sleeve defining an open ended hollow central cavity. The end shaft members 20a and 20b are supported for rotation about the longitudinal axis 14 on bearing means 70 and 80, respectively. Each of the four wheels 30, 40, 50 and 60 has a hub portion having a plurality of rotor blades extending outwardly therefrom and a central opening extending axially therethrough to accommodate an elongated tie rod 16 extending along the longitudinal axis 12 through the central axial openings in the four wheels and through the hollow cavities of the shaft members. The tie rod 16 is bolted up at its ends to the outer wheels 30, 40 to axially clamp the four wheels and the shaft members together with sufficient axial clamping load that all four wheels and all shaft members rotate together as one integral wheel and shaft assembly.

The first end wheel 30 is mounted to the outboard end of the first end shaft member 20a and the second end wheel 40 is mounted to the outboard end of the second end shaft member 20b. The central wheel 50 is mounted to the inboard end of the first end shaft member 20a and the central wheel 60 is mounted to the second end shaft member 20b. The two central wheels 50 and 60 are additionally mounted to the central shaft member 20c for rotation therewith and disposed in back to back relationship on opposite sides of a disc 14 having a central opening circumscribing the central shaft member 20c and extending radiating outwardly therefrom. As illustrated in FIG. 2, each of the wheels 30, 40, 50 and 60 is mounted to its respective end shaft member 20a, 20b by an interference fit between a piloting rim 32, 42, 52, 62, extending axially outwardly from the wheel hub, and the inner wall of the annular shaft member bounding the central cavity of the shaft member, into which cavity the rim is precisely piloted, thereby ensuring that the wheels and the shaft members rotate together about the axis 12. Alternate methods of mounting the wheels to the shaft members be may used in constructing the air cycle machine of the present invention. For example, as illustrated in FIG. 2, the third wheel 50 is not mounted to the central shaft member 20c by means of a piloting rim, but rather is mounted to the central shaft member 20c through a pilot bushing 18 coaxially disposed about the axis 12. The hub of the third wheel 50 has a central piloting socket 54 sized to receive and retain by interference fit one end of the pilot bushing 18. The other end of the pilot bushing 18 is received into one end of the central cavity of the central shaft member 20c and retained therein by interference fit with the inner wall of the central shaft member 20c. The fourth wheel 60 is mounted the central shaft member 20c through a piloting rim 64 which is received into the other end of the central cavity of the central shaft member 20c and retained therein by interference fit with the inner wall thereof. The four wheels and the three shaft members to which they are so mounted are axially loaded together by the tie rod 16 extending coaxially therethrough, thereby ensuring that the four wheels and the three shaft members rotate together about the longitudinal axis 12 as a single assembly. The pilot bushing 18 also serves to center the entire wheel and shaft assembly coaxially about the tie rod 16.

Figure 3:
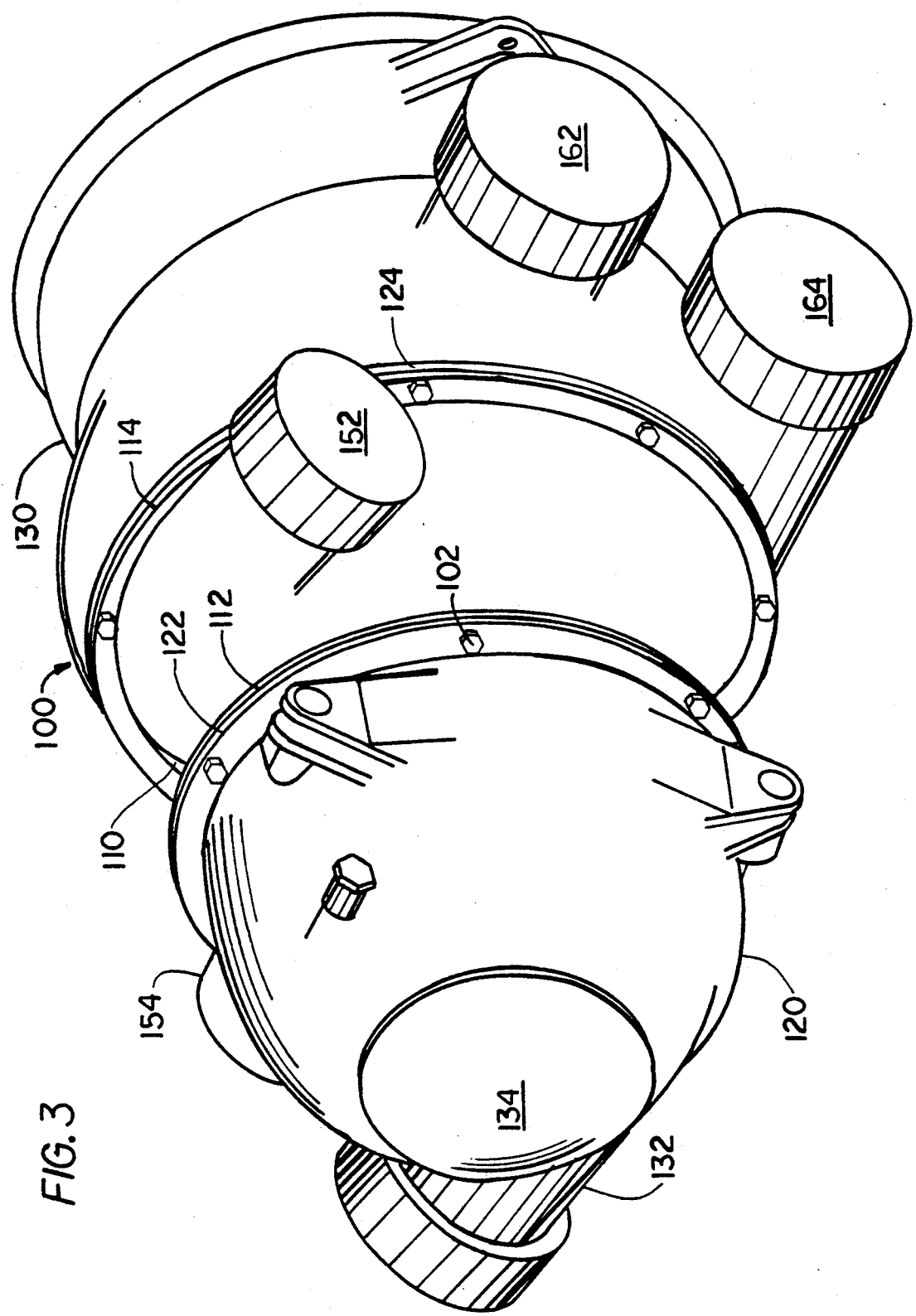
FIG. 3 is a perspective view of the housing of the air cycle machine of FIG. 2.

The embodiment of the air cycle machine 10 of the present invention illustrated in FIGS. 2 and 3 is particularly suited for use in a condensing cycle air conditioning and temperature control system for cooling and dehumidifying air for supply to an enclosure for occupant comfort, such as the condensing cycle environmental control system for supplying cooled and dehumidified air to the cabin of an aircraft as disclosed in commonly assigned U.S. Pat. No. 5,086,622, which is hereby incorporated by reference. In this embodiment, the central third wheel 50 comprises a first stage turbine rotor, the central fourth wheel comprises a compressor rotor, the outboard first wheel 30 comprises a second stage turbine rotor, and the outboard second wheel 40 comprises a fan rotor. The first and second stage turbine rotors 30 and 50 serve not only to expand and cool the air being conditioned, but also extract energy from the air being expanded for rotating the entire wheel and shaft assembly so to drive the fan rotor 40 and the compressor rotor 60. The wheel and shaft assembly is disposed within a housing 100 which provides individual inlet and outlet ducts for each of the rotors and also provides support for the bearing means 70 and 80. The housing 100 is comprised of two or more sections to facilitate assembly. For example, the housing 100 may advantageously be comprised of three sections: a central section 110 surrounding the turbine rotor 50 and providing a first stage turbine inlet duct 152 for supplying air to the turbine rotor 50 to be expanded therein and a first stage turbine outlet duct 154 for discharging the exhaust air expanded in the turbine rotor 50, a first end section 120 surrounding the turbine rotor 30 and providing a second stage turbine inlet duct 132 for supplying air to the turbine rotor 30 to be expanded therein and an axially directed second stage turbine outlet duct 134 for discharging the exhaust air expanded in the turbine rotor 30, and a second end section 130 surrounding both the compressor rotor 60 and the fan rotor 40 and providing an inlet duct 162 for supplying air to the compressor rotor 60 to be compressed therein, an outlet duct 164 for discharging air compressed via the compressor rotor 60, an inlet duct 142 for directing ram cooling air to the fan rotor 40 and an axially directed outlet duct 144 for discharging ram cooling air having passed through the fan rotor 40.

The central housing section 110 is mounted at one of its ends to the first end housing section 120 by a plurality of circumferentially spaced bolts 102 attaching a flange 112 of the central section 110 to a flange 122 of the end section 120, and at its other end to the second end housing section 130 by a plurality of circumferentially spaced bolts 104 passing through the central disc member 14 to attach a flange 114 of the central section 110 to a flange 124 of the end section 130. The central disc member 14, which is disposed about the central shaft member 20c and extends therefrom outwardly between the central housing section 110 and the second housing section 130 serves to separate the air flow circuit associated with the compressor rotor 60 from the air flow circuit associated with the turbine rotor 50. The central disc member 14 may be made of a thermal insulating material, such as for example a low thermal conductivity plastic or composite material, to minimize undesirable heat transfer from the higher temperature compressed air passing through the compressor outlet duct 164 to the lower temperature compressed air passing through the first stage turbine inlet duct 152 to the turbine rotor 50.

In the embodiment of the air cycle machine of the present invention depicted in FIG. 2, the bearing means 70 and 80 radially supporting the shaft and wheel assembly for rotation about the longitudinal axis 12 comprise hydrodynamic journal bearings, such as for example gas film foil journal bearings of the type disclosed in commonly assigned U.S. Pat. Nos. 4,133,585; 4,247,155; and/or 4,295,689. The hydrodynamic journal bearing 70 is disposed about the first end shaft member 20a between the first wheel 30 and the third wheel 50, and the hydrodynamic journal bearing 80 is disposed about the second end shaft member 20b between the second wheel 40 and the fourth wheel 60. Each of the hydrodynamic bearings 70 and 80 comprises an inner race mounted to its respective shaft member, an outer race disposed coaxially about the inner race in radially spaced relationship therefrom and supported in the housing 100 to restrict axial or rotation displacement of the outer race, and a foil pack disposed in an annular space formed between the radially spaced inner and outer races through which pressurized air is passed to provide the appropriate hydrodynamic forces necessary for the journal bearings 70 and 80 to support the shaft and wheel assembly for rotation about longitudinal axis 12.

Additionally, a hydrodynamic thrust bearing 26 is provided for axially supporting the shaft and wheel assembly of the air cycle machine 10. The hydrodynamic thrust bearing may comprise a gas film foil thrust bearing, such as for example of the type disclosed in commonly assigned U.S. Pat. Nos. 4,082,325; 4,116,503; 4,247,155 and/or 4,462,700. The bearing 26 includes an outboard bearing member 26a and an inboard bearing member 26b operatively disposed on opposite sides of a thrust disc 90 extending outwardly from the first end shaft member 20a intermediate an end wall 116 of the central housing section 110 and a bearing plate 118 disposed between the central housing section 110 and the first end section 120 inboard of the outboard first wheel 30.

In operation, relatively cool, pressurized air from the second stage turbine inlet duct 132 is passed through a flow tube 28 into an annular chamber 34 located between the bearing plate 118 and the end wall 116. A first portion of this cool pressurized air flows therefrom through the outboard thrust bearing member 26a to pressurize and cool the bearing member and thence through openings 36 in the outboard end portion of the first end shaft member 20a into the hollow interior cavity thereof. A second portion of this cool pressurized air flows from the chamber 34 through the inboard thrust bearing member 26b and thence through the first journal bearing 70 to cool and pressurize both of these hydrodynamic bearings. After traversing the first journal bearing 70, this second portion of the cool pressurized air passes through openings 38 in the inboard end portion of the first end shaft member 20a into the hollow interior cavity thereof to remix with the first portion of this flow. The recombined flow thence passes through the hollow interior of the shaft and wheel assembly to pass through openings 44 in the inboard end portion of the second end shaft member 20b to enter a chamber 46 from which this cool pressurized air passes through the second journal bearing 80, thereby cooling and pressuring the second hydrodynamic journal bearing 80, before exiting through a labyrinth seal 48 into the duct 142. Additional labyrinth seals 58 and 68 are provided to prevent the bearing cooling and pressurizing air from escaping the bearing flow circuit. Seal 58, which is disposed between the inboard end portion of the first end shaft member 20a and the inboard end of the first journal bearing 70, allows a limited flow of higher pressure, cool air from the first stage turbine outlet duct 154 to leak into the bearing flow circuit thus sealing the first journal bearing 70, and seal 68, which is disposed between the inboard end portion of the second end shaft member 20b and the surrounding housing allows a limited flow of higher pressure, relatively cool air to leak from the compressor inlet duct 162 into the chamber 46 thereby sealing the second journal bearing 80.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. An air cycle machine for conditioning air for supply to an enclosure, comprising:

shaft means disposed for rotation about a longitudinally extending axis;

a first wheel mounted to a first end portion of said shaft means for rotation therewith;

a second wheel mounted to a second end portion of said shaft means for rotation therewith;

a third wheel mounted to a central portion of said shaft means in spaced relationship from said first wheel and from said second wheel for rotation with said shaft means;

a fourth wheel mounted to the central portion of said shaft means in back-to-back relationship with said third wheel between said second wheel and said third wheel for rotation with said shaft means, one of said centrally disposed third and fourth wheels comprising a compressor rotor operative to compress the conditioning air passing therethrough and the other of said centrally disposed third and fourth wheels comprising a turbine rotor operative to expand the conditioning air passing therethrough thereby cooling the expanded conditioning air and extracting energy therefrom for driving said shaft means in rotation about the axis;

first journal bearing means for supporting said shaft means for rotation about the axis, said first bearing means disposed about the first end portion of said shaft means between said first wheel and said third wheel; and second journal bearing means for supporting said shaft means for rotation about the axis, said second bearing means disposed about the second end portion of said shaft means between said second wheel and said fourth wheel.

2. An air cycle machine as recited in claim 1 further comprising a housing disposed about said shaft means and said first, second, third and fourth wheels mounted to said shaft means, said housing supporting the bearing means, said housing having a central section circumscribing said third wheel and defining an inlet duct thereto and an outlet duct therefrom, a first end section circumscribing said first wheel and defining an inlet duct thereto and an outlet duct therefrom, and a second end section circumscribing said second and fourth wheels and defining an inlet duct to said fourth wheel, an inlet duct to said second wheel, an outlet duct from said second wheel, and an outlet duct from said fourth wheel, said central section supporting said first journal bearing means and said second end section supporting said second journal bearing means.

3. An air cycle machine as recited in claim 1 wherein each of said first and second end wheels comprises a fan rotor.

4. An air cycle machine as recited in claim 1 wherein one of said first and second end wheels comprises a fan rotor and the other of said first and second end wheels comprises a second turbine rotor.

5. An air cycle machine as recited in claim 1 wherein: said fourth wheel comprises a compressor rotor operative to compress the conditioning air passing therethrough, said third wheel comprises a first stage turbine rotor operative to expand the compressed conditioning air thereby cooling the expanded conditioning air and extracting energy therefrom for driving said shaft means in rotation about the axis, said first wheel comprises a second stage turbine rotor operative to further expand the compressed conditioning air thereby further cooling the expanded conditioning air and further extracting energy therefrom for driving said shaft means in rotation about the axis, and said second wheel comprises a fan rotor.

6. An air cycle machine as recited in claim 5 further comprising a housing disposed about said shaft means and said first, second, third and fourth wheels mounted to said shaft means, said housing supporting the bearing means, said housing having a central section circumscribing said third wheel and defining an inlet duct thereto and an outlet duct therefrom, a first end section circumscribing said first wheel and defining an inlet duct thereto and an outlet duct therefrom, and a second end section circumscribing said second and fourth wheels and defining an inlet duct to said fourth wheel, an inlet duct to said second wheel, an outlet duct from said second wheel, and an outlet duct from said fourth wheel, said central section supporting said first journal bearing means and said second end section supporting said second journal bearing means.

7. An air cycle machine for conditioning air for supply to an enclosure, comprising:

shaft means disposed for rotation about a longitudinally extending axis, said shaft means having a first end portion, a second end portion, and a central portion disposed therebetween; a first wheel mounted to the first end portion of said shaft means for rotation therewith, said first wheel comprising a turbine rotor; a second wheel mounted to the second end portion of said shaft means for rotation therewith, said second wheel comprising a fan rotor; a third wheel mounted to the central portion of said shaft means in spaced relationship from said first wheel and from said second wheel for rotation with said shaft means, said third wheel comprising a turbine rotor;

a fourth wheel mounted to the central portion of said shaft means in back-to-back relationship with said third wheel between said second wheel and said third wheel for rotation with said shaft means, said fourth wheel comprising a compressor rotor; first journal bearing means for supporting said shaft means for rotation about the axis, said first bearing means disposed about the first end portion of said shaft means between said first wheel and said third wheel; and second journal bearing means for supporting said shaft means for rotation about the axis, said second bearing means disposed about the second end portion of said shaft means between said second wheel and said fourth wheel.

8. In an air cycle machine for conditioning air for supply to an enclosure, of the type having a plurality of rotors coaxially mounted on a single shaft for rotation therewith, wherein the shaft is supported for rotation about a longitudinally extending axis by a plurality of journal bearings, the improvement comprising:

a. the shaft having a first end portion, a second end portion, and a central portion disposed therebetween;
  b. a first turbine rotor fixedly mounted on a first end portion of the shaft;
  c. a fan rotor fixedly mounted on the second end portion of the shaft;
  d. a second turbine rotor fixedly mounted on the central portion of the shaft in spaced relationship from the first turbine rotor and from the fan rotor;
  e. a compressor rotor fixedly mounted on the central portion of the shaft in back-to-back relationship with the second turbine rotor between the fan rotor and the second turbine rotor, wherein the second turbine rotor and the compressor rotor each has a set of impeller blades on one side and a substantially planar surface on an opposite side without any blades, the second turbine rotor and the compressor rotor are supported for rotation by a central disc between them with piloting rims, the two planar surfaces abut the central disc on opposite sides of the disc, and the two sets of blades extend away from each other in opposite directions; and
  f. whereby the back-to-back relationship minimizes the overall length of the shaft and permits the shaft to be sufficiently supported for rotation by only two journal bearings, with one of the journal bearings being disposed about the first end portion of the shaft between the turbine rotors and the second journal bearing being disposed about the second end portion of the shaft between the fan and compressor rotors.

* * * * *